United States Patent
Huang et al.

(10) Patent No.: US 11,043,678 B2
(45) Date of Patent: Jun. 22, 2021

(54) COMPOSITE MADE OF IONIC LIQUID AND OCTAHEDRAL PT—NI—CU ALLOY NANOPARTICLES FOR OXYGEN REDUCTION CATALYSIS

(71) Applicants: Toyota Motor Engineering & Manufacturing North America, Inc., Plano, TX (US); The University of Akron, Akron, OH (US); Toyota Jidosha Kabushiki Kaisha, Toyota (JP)

(72) Inventors: Kan Huang, Farmington Hills, MI (US); Li Q. Zhou, Ann Arbor, MI (US); Hongfei Jia, Ann Arbor, MI (US); Hisao Kato, Nagoya (JP); Zhenmeng Peng, Hudson, OH (US); Xiaochen Shen, Akron, OH (US)

(73) Assignees: Toyota Motor Engineering & Manufacturing North America, Inc., Plano, TX (US); Toyota Jidosha Kabushiki Kaisha, Aichi-ken (JP); The University of Akron, Akron, OH (US)

( * ) Notice: Subject to any disclaimer, the term of this patent is extended or adjusted under 35 U.S.C. 154(b) by 0 days.

(21) Appl. No.: 16/030,103

(22) Filed: Jul. 9, 2018

(65) Prior Publication Data
US 2020/0014034 A1 Jan. 9, 2020

(51) Int. Cl.
*H01M 4/86* (2006.01)
*H01M 4/92* (2006.01)
(Continued)

(52) U.S. Cl.
CPC ....... *H01M 4/8652* (2013.01); *H01M 4/9008* (2013.01); *H01M 4/921* (2013.01);
(Continued)

(58) Field of Classification Search
CPC .... H01M 4/8663; H01M 4/921; H01M 4/926; H01M 2004/8689; H01M 2250/20; H01M 2008/1095
See application file for complete search history.

(56) References Cited

U.S. PATENT DOCUMENTS 5,827,602 A * 10/1998 Koch ............. C25D 3/02
429/328
5,872,602 A   2/1999 Johnson
(Continued)

OTHER PUBLICATIONS

Structural analysis of BETI using ChemBioDraw Ultra. (Year: 2019).*
(Continued)

*Primary Examiner* — Barbara L Gilliam
*Assistant Examiner* — Nathanael T Zemui
(74) *Attorney, Agent, or Firm* — Christopher G. Darrow; Darrow Mustafa PC (57) ABSTRACT

Improved oxygen reduction reaction catalysts include octahedral nanoparticles of a platinum-copper-nickel alloy contacted by a secondary ionomer. The alloy can have a formula of $Pt_2CuNi$, and the secondary ionomer can include an ionic liquid, 1-methyl-2,3,4,6,7,8-hexahydro-1H-pyrimido[1,2-a]pyrimidin-9-ium 1,1,2,2,3,3,4,4-nonafluorobutane-1-sulfonate ($[MTBD][C_4F_9SO_3]$). The oxygen reductions catalysts have improved stability, as well as mass area and specific area comparted to competing catalysts.

20 Claims, 4 Drawing Sheets

(51) Int. Cl.
*H01M 4/90* (2006.01)
*H01M 8/1018* (2016.01)

(52) U.S. Cl.
CPC .... *H01M 4/926* (2013.01); *H01M 2004/8689* (2013.01); *H01M 2008/1095* (2013.01)

(56) References Cited

U.S. PATENT DOCUMENTS

| | | | |
|---|---|---|---|
| 2006/0058185 A1* | 3/2006 | Cendak | B01J 19/0046 502/326 |
| 2007/0042247 A1* | 2/2007 | Baird | H01M 8/04029 429/434 |
| 2011/0177428 A1* | 7/2011 | Dai | H01B 1/122 429/498 |
| 2011/0189589 A1* | 8/2011 | Erlebacher | B01J 21/02 429/523 |
| 2014/0113218 A1* | 4/2014 | Erlebacher | B01J 23/89 429/524 |
| 2016/0158730 A1 | 6/2016 | Peng | |
| 2018/0287165 A1 | 10/2018 | Huang et al. | |

OTHER PUBLICATIONS

Structural analysis of NfO (C4F9SO3) using ChemBioDraw Ultra. (Year: 2019).*

Zhang; "Octahedral Pt2CuNi Uniform Alloy Nanoparticle Catalyst with High Activity and Promising Stability for Oxygen Reduction Reaction"; Published: Mar. 9, 2015 (Year: 2015).*

Haibara; "Solubility and Diffusion Coefficient of Oxygen in Protic Ionic Liquids with Different Fluoroalkyl Chain Lengths"; Available online: Apr. 2, 2014 (Year: 2014).*

Zhang, G. et al., "Boosting Performance of Low Temperature Fuel Cell Catalysts by Subtle Ionic Liquid Modification," ACS Appl. Mater. Interfaces, 7, pp. 3562-3570 (2015).

Chen, B., et al., "Improving the Conductivity of Sulfonated Polyimides as Proton Exchange Membranes by Doping of a Protic Ionic Liquid," Polymers, 6, pp. 2720-2736 (2014).

Snyder, J. et al., "Oxygen reduction in nanoporous metal-ionic liquid composite electrocatalysts," Nature Materials, vol. 9, pp. 904-907 (2010).

Snyder, J. et al., Oxygen Reduction Reaction Performance of [MTBD][beti]-Encapsulated Nanoporous NiPt Alloy Nanoparticles, Adv. Fund. Mater., 23, pp. 5494-5501 (2013).

Zhang, C. et al., "Octahedral Pt2CuNi Uniform Alloy Nanoparticle Catalyst with High Activity and Promising Stability for Oxygen Reduction Reaction," ACS Catal. 5, pp. 2296-2300 (2015).

Huang, K., et al., "Enhancing Pt/C Catalysts for the Oxygen Reduction Reaction with Protic Ionic Liquids: The Effect of Anion Structure," Journal of the Electrochemical Society, 164 (13) pp. F1-F12 (2017).

Wang, C. et al., "Rational Development of Ternary Alloy Electrocatalysts," J. Phys. Chem. Lett., 3, pp. 1668-1673 (2012).

Zhang, C., "Octahedral Pt2CuNi Uniform Alloy Nanoparticle Catalyst with High Activity and Promising Stability for Oxygen Reduction Reaction," ACS Catal. 5, pp. 2296-2300 (2015) (Supplementary information available at: https://pubs.acs.org/doi/suppl/10.1021/cs502112g).

* cited by examiner

COMPOSITE MADE OF IONIC LIQUID AND OCTAHEDRAL PT—NI—CU ALLOY NANOPARTICLES FOR OXYGEN REDUCTION CATALYSIS

TECHNICAL FIELD

The present disclosure generally relates to fuel cells and, more particularly, to improved catalysts for an oxygen reduction reaction in fuel cells.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Fuel cell vehicles (FCVs) polymer electrolyte membrane fuel cells (PEMFCs) to provide power. A PEMFC accounts for a substantial portion of the cost of the drivetrain of an FCV, and improvement in PEMFC power efficiency is therefore an important criterion for improving the economic viability of FCVs.

The oxygen reduction reaction (ORR) that occurs at the cathode of PEMFCs has relatively slow chemical kinetics, thus posing an obstacle to cell performance. Octahedral platinum alloy catalysts have been shown to have improved performance, at least in part due the structural presentation of optimal surface facets. Even with octahedral Pt alloy catalysts, additional improvements are needed.

Ionic liquids have been studied as a non-aqueous reaction media for electrochemical applications due to their low volatility, wide electrochemical windows, good ionic conductivity and good chemical stability. The use of ionic liquids as ORR promoters provides significant improvements in both specific activity and mass activity, however additional improvements remain to be developed.

Accordingly, it would be desirable to provide an improved combination of ionic liquid and metal catalyst for enhanced activity in catalyzing ORR in a PEMFC.

SUMMARY

This section provides a general summary of the disclosure, and is not a comprehensive disclosure of its full scope or all of its features.

In various aspects, the present teachings provide an oxygen reduction reaction (ORR) catalyst. The ORR catalyst includes octahedral nanoparticles comprising a platinum alloy having platinum, nickel, and copper (Pt—Ni—Cu). The ORR catalyst further includes a secondary ionomer contacting the octahedral nanoparticles, the secondary ionomer comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]).

In other aspects, the present teachings provide a cathode for oxygen reduction. The cathode includes a cathodic current collector. The cathode further includes octahedral nanoparticles comprising a platinum alloy having platinum, nickel, and copper (Pt—Ni—Cu). The cathode additionally includes a secondary ionomer contacting the octahedral nanoparticles, the secondary ionomer comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]).

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide improved fuel cell catalysts for an oxygen reduction reaction, useful to improve the efficiency of polymer electrolyte membrane fuel cells (PEMFCs). The results described hereinafter that PEMFCs utilizing the disclosed catalysts at the cathode have superior activity compared to those utilizing a state-of-the-art catalyst.

The catalysts of the present disclosure include an octahedral Pt—Ni—Cu alloy impregnated with an ionic liquid (IL). In particular, while previous catalysts having octahedral $Pt_2CuNi$ nanoparticles have been shown to be among the most stable and active catalysts known, the present catalysts having $Pt_2CuNi$ nanoparticles impregnated with a hydrophobic ionic liquid (1-methyl-2,3,4,6,7,8-hexahydro-1H-pyrimido[1,2-a]pyrimidin-9-ium1,1,2,2,3,3,4,4,4-nonafluorobutane-1-sulfonate ([MTBD][$C_4F_9SO_3$]) as secondary ionomer have superior specific activity and mass activity.

Thus a catalyst composition for catalyzing ORR (referred to alternatively as an ORR catalyst) in a PEMFC is disclosed. The catalyst composition includes platinum alloy nanoparticles. In some implementations, the nanoparticles of the platinum alloy can be mixed with particles of another material, such as carbon. In particular implementations, the platinum alloy include an alloy of platinum, nickel, and copper (Pt—Ni—Cu). In some such instances, the molar ratio of nickel:copper in the alloy can be within a range of 1:2 to 2:1, and in some particular instances can be 1:1. In some instances, the molar ratio of platinum:nickel in the alloy can be within a range of 1:1 to 4:1, and in some particular instances can be 2:1. In some instances, the molar ratio of platinum:nickel:copper in the alloy can be 2:1:1, represented by the formula $Pt_2NiCu$. It is to be understood that an alloy of formula $Pt_2NiCu$ can have some minor variance from the stated stoichiometry; for example an alloy having an exact formula of $Pt_{50}Ni_{25}Cu_{24}$ can be regarded as an approximate $Pt_2NiCu$ alloy.

In general, it will be preferable that Pt—Ni—Cu nanoparticles have uniform distribution of platinum, nickel, and copper throughout the nanoparticle. Such uniformity of distribution can be measured, for example, by near equivalence of the lattice parameter obtained using Bragg's law and using Vegard's law. In many implementations, the Pt—Ni—Cu can have a face-centered cubic (fcc) unit cell and the nanoparticles can have an octahedral morphology.

In some implementations, the particles of a catalytic metal can have a specific surface area of at least 10 $m^2/g$, or 20 $m^2/g$, or 30 $m^2/g$, or 40 $m^2/g$, or 50 $m^2/g$, or 60 $m^2/g$, or 70 $m^2/g$, or 80 $m^2/g$, or 90 $m^2/g$, or 100 $m^2/g$. In some implementations, the particles of a catalytic metal will be nanoparticles having an average maximum dimension of less than 100 nm, or less than 90 nm, or less than 80 nm, or less than 70 nm, or less than 60 nm, or less than 50 nm, or less than 40 nm, or less than 30 nm, or less than 20 nm, or less than 10 nm. In some specific implementations, the catalyst composition will include platinum alloy nanoparticles having an average maximum dimension of 2-5 nm. In some implementations, the particles of a catalytic metal will include porous particles.

Figure 1A:
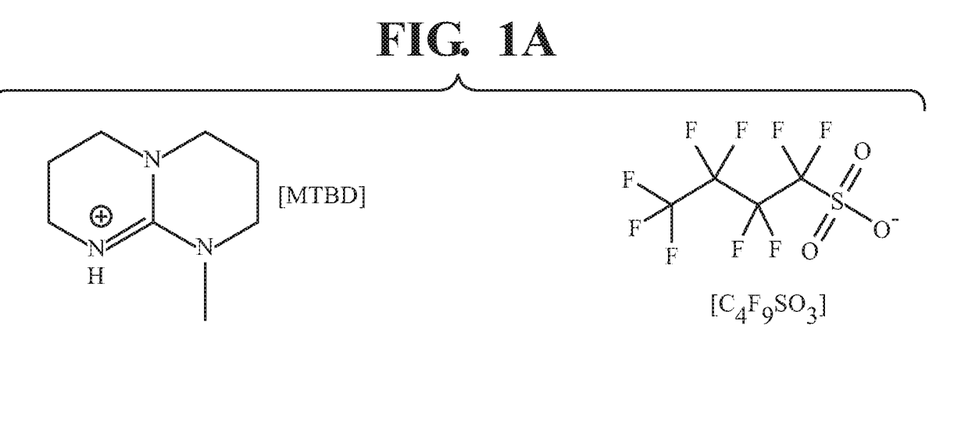
FIG. 1A shows chemical line drawings of [MTBD]$^+$ and [$C_4F_9SO_3$]$^-$ ions employed in an ionic liquid of the present teachings.

Catalyst compositions of the present disclosure include a secondary ionomer contacting the platinum alloy nanoparticles. The secondary ionomer includes the ionic liquid, 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]). FIG. 1 shows line drawings of the [MTBD]$^+$ and [$C_4F_9SO_3$]$^-$ ions that form the ionic liquid. [MTBD][$C_4F_9SO_3$], when contacting particles of a catalytic metal, improves ORR efficiency and catalyst stability, as discussed further below. A catalyst that includes particles of a catalytic metal in contact with an ionic liquid will be referred to henceforth as a secondary ionomer catalyst. In certain exemplary embodiments discussed herein, the solid catalyst will include a mixture of platinum and carbon particles. Such an exemplary catalyst, when contacted by [MTBD][$C_4F_9SO_3$], will be alternatively referred to as Pt/C-[MTBD][$C_4F_9SO_3$]. In some implementations, the catalyst composition may also include a polymeric ionomer, such as Nafion™, contacting the solid catalyst.

In some implementations, catalyst compositions of the present disclosure will have [MTBD][$C_4F_9SO_3$] present at a weight ratio relative to the platinum alloy within a range of 1.25:1 to 3.85:1. In some implementations, catalyst compositions of the present disclosure will have [MTBD][$C_4F_9SO_3$] present at a weight ratio relative to the platinum alloy within a range of 2:1 to 3:1. In some implementations, catalyst compositions of the present disclosure will have [MTBD][$C_4F_9SO_3$] present at a weight ratio relative to the platinum alloy within a range of 2.5:1 to 2.6:1. In some implementations, particles of catalytic metal will be fully coated by the [MTBD][$C_4F_9SO_3$], and in other implementations, particles of catalytic metal will be partially coated by the [MTBD][$C_4F_9SO_3$]. In some implementations, particles of catalytic metal will be porous and will be impregnated with the [MTBD][$C_4F_9SO_3$].

Figure 1B:
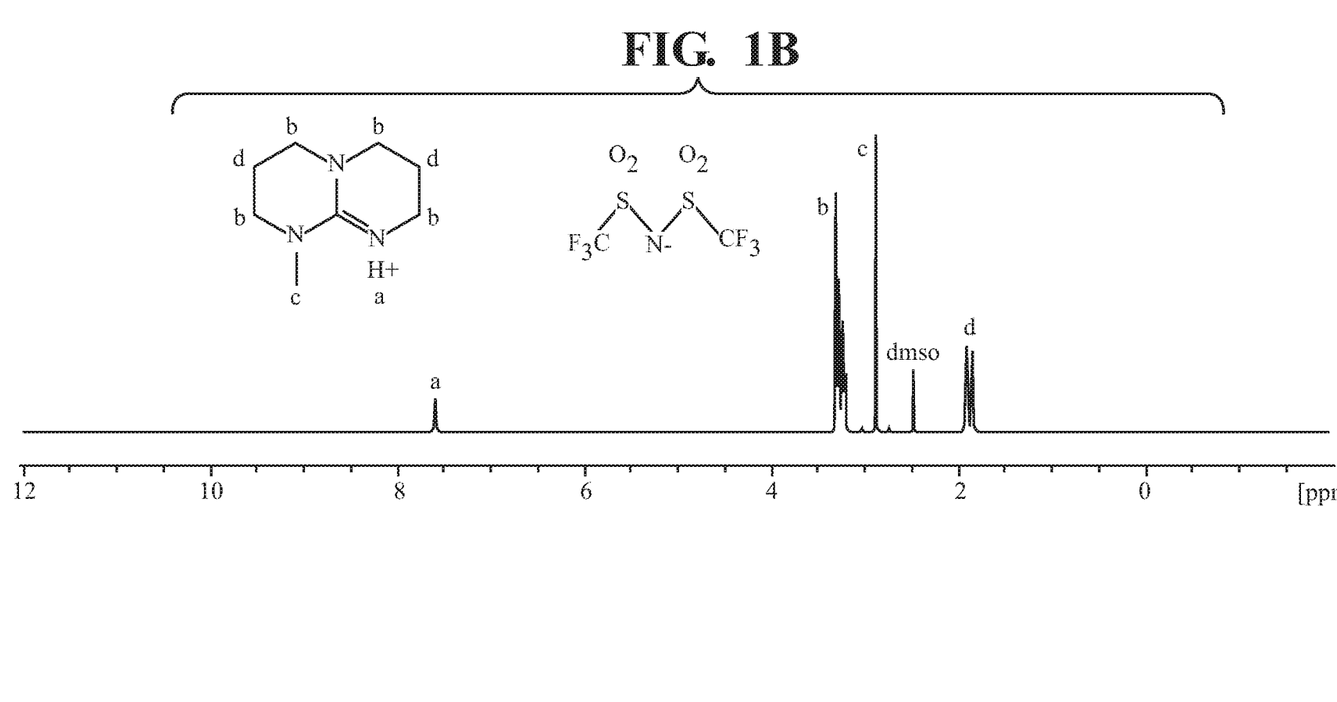
FIG. 1B shows an NMR spectrum of the ionic liquid formed by the ions of FIG. 1A.

The [MTBD] cation and the [$C_4F_9SO_3$] anion that make up the disclosed ionic liquid are shown in FIG. 1A, while FIG. 1B shows and NMR spectrum of the ionic liquid, confirming its synthesis and purity.

While not shown here, $O_2$ solubility is measured at room temperature at pressure up to 45 bar for [MTBD][$C_4F_9SO_3$], as well as four comparative ionic liquids: MTBD[beti], MTBD[TFSI], [MTBD][$C_2F_5OC_2F_4SO_3$], and [MTBD][$C_6F_{13}SO_3$], as well as 0.1 M $HClO_4$. A good linearization is found between pressure and mole fraction, and $O_2$ mole fraction ([$O_2$]) at 1 bar is extrapolated from the plot. One-dimensional mass diffusion is employed to calculate the diffusion coefficient (D) according to Equation 1.

$$\frac{\partial C}{\partial t} = D \frac{\partial^2 C}{\partial z^2} \qquad \text{Eq. 1}$$

with an initial condition: $C=C_0$, when $t=0$, and $0<z<L$; and a boundary condition: $C=C_s$, when $t>0$, and $z=0$, and $$\frac{\partial c}{\partial z} = o;$$

where C is the concentration of $O_2$ in IL; $C_0$ is the initial homogeneous concentration of $O_2$ in IL, and its initial value is zero; $C_s$ is the saturation concentration; L is the depth of the ionic liquid in the sample container; D is the diffusion coefficient that is assumed to be a constant. The analytical solution of space average $O_2$ concentration (<C>) is determined according to Equation 2.

$$\langle C \rangle = C_s \left[ 1 - 2\left(1 - \frac{C_o}{C_s}\right) \sum_{n=0}^{\infty} \frac{\exp(-\lambda_n^2 Dt)}{L^2 \lambda_n^2} \right] \qquad \text{Eq. 2}$$

where $$\lambda_n = \frac{\left(n + \frac{1}{2}\right)\pi}{L}.$$

The $O_2$ diffusion properties of the disclosed [MTBD][$C_4F_9SO_3$] ionic liquid, as well as the comparative species, are summarized in Table 1. It should be noted that [MTBD][$C_2F_5OC_2F_4SO_3$], [MTBD][$C_6F_{13}SO_3$], and [MTBD][$C_4F_9SO_3$] are solid at room temperature, making the direct measurement of $O_2$ diffusion at room temperature impossible. But because [MTBD][C$_2$F$_5$OC$_2$F$_4$SO$_3$], [MTBD][C$_6$F$_{13}$SO$_3$], and [MTBD][C$_4$F$_9$SO$_3$] are soluble in [MTBD][TFSI], the O$_2$ solubility and diffusion in mixed ionic liquids is measurable. The individual O$_2$ solubility is calculated according to the Lever Rule, as indicated by Equation 3:

$$X_{O2} = X1 * X_{O2,1} + X2 * X_{O2,2} \qquad \text{Eq. 3}$$

where $X_{O2}$ is [O$_2$] in the ionic liquid mixture, X1 and X2 are mole fraction of individual ILs in the gas-free mixture, and $X_{O2,1}$ and $X_{O2,2}$ are [O$_2$] in pure individual ILs. Regarding the diffusion coefficient of those solid ILs, elevated temperature was required to reach a liquid phase and diffusion coefficients are thus reported at 60° C.

Figure 2A:
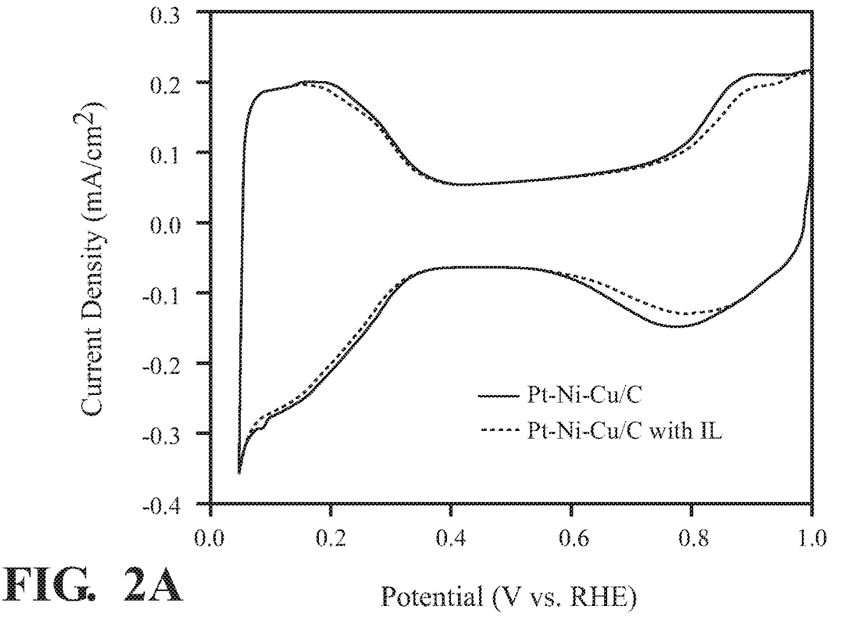
FIG. 2A is a cyclic voltammogram across an electric potential window of 0.05 V to 1.0 V of an electrochemical cell having a cathodic catalyst of octahedral Pt—Cu—Ni/C without and with the ionomer of FIG. 1.
Figure 2B:
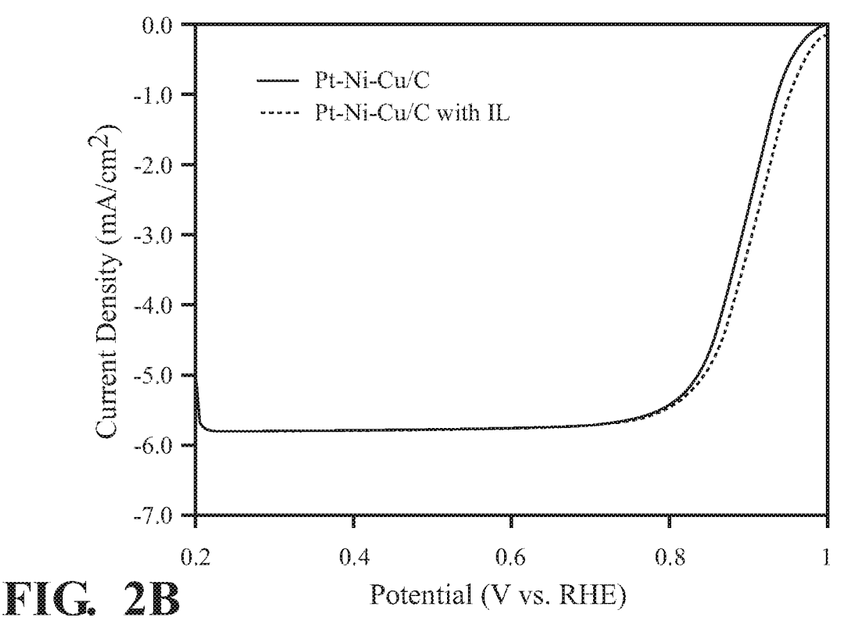
FIG. 2B shows linear sweep voltammogram across an electric potential window of 0.05 V to 1.0 V of the electrochemical cells of FIG. 2A.

FIGS. 2A and 2B show cyclic voltammetry and linear sweep voltammetry curves across an electric potential window of 0.05 V to 1.0 V, of PEMFCs having an exemplary catalyst of the present disclosure. The catalysts of the PEMFCs of FIGS. 2A and 2B include octahedral Pt$_2$CuNi alloy nanoparticles, in admixture with carbon particles, with the alloy nanoparticles either contacted by the disclosed ionic liquid [MTBD][C$_4$F$_9$SO$_3$], or without the ionic liquid. The voltammetry curves of FIGS. 2A and 2B are measured across an electric potential window of 0.05 V to 1.0 V (vs. a reversible hydrogen electrode [RHE]). The electrochemical active surface area (ECSA) were very similar without and with ionic liquid: 41 and 37 m$^2$/g Pt respectively. The specific activity (SA) and mass activity (MA) increased 67% and 52% respectively after IL incorporation.

Figure 2C:
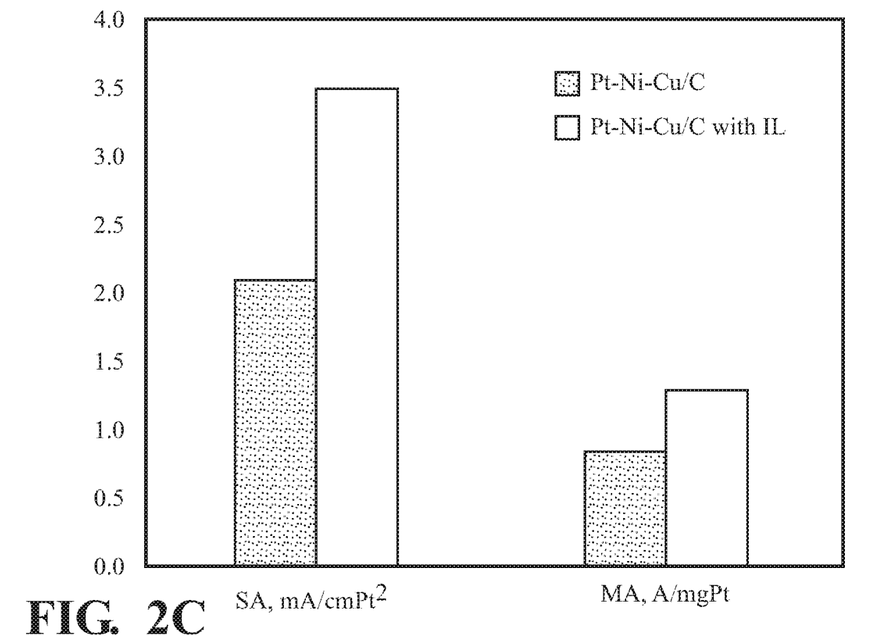
FIG. 2C shows calculated specific activity and mass activity, at 0.9 V vs RHE, for the electrochemical cells of FIGS. 2A and 2B, and calculated across the electric potential window of 0.05 V to 1.0 V.

FIG. 2C shows calculated specific activity and mass activity of the two PEMFCs of FIGS. 2A and 2B, at 0.9 V vs. RHE. It will be noted that MA is calculated using the Koutecký-Levich equation, and that MA=SA*ECSA. As shown in FIG. 2C, the ORR catalysts contacted by the disclosed ionic liquid have superior specific activity than does the catalyst without the ionic liquid.

Figure 3A:
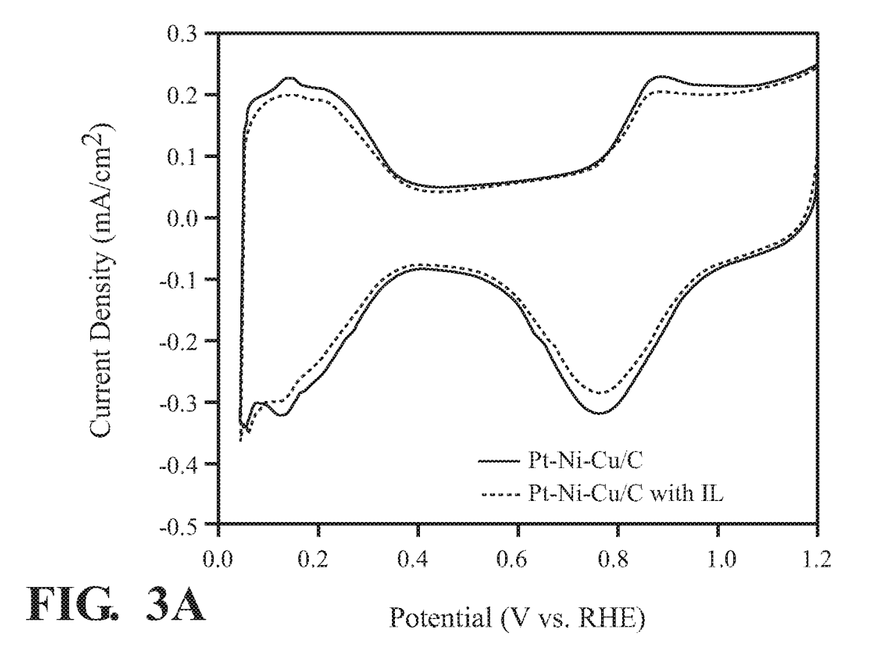
FIG. 3A is a cyclic voltammogram across an electric potential window of 0.05 V to 1.2 V of an electrochemical cell having a cathodic catalyst of octahedral Pt—Cu—Ni/C without and with the ionomer of FIG. 1.
Figure 3B:
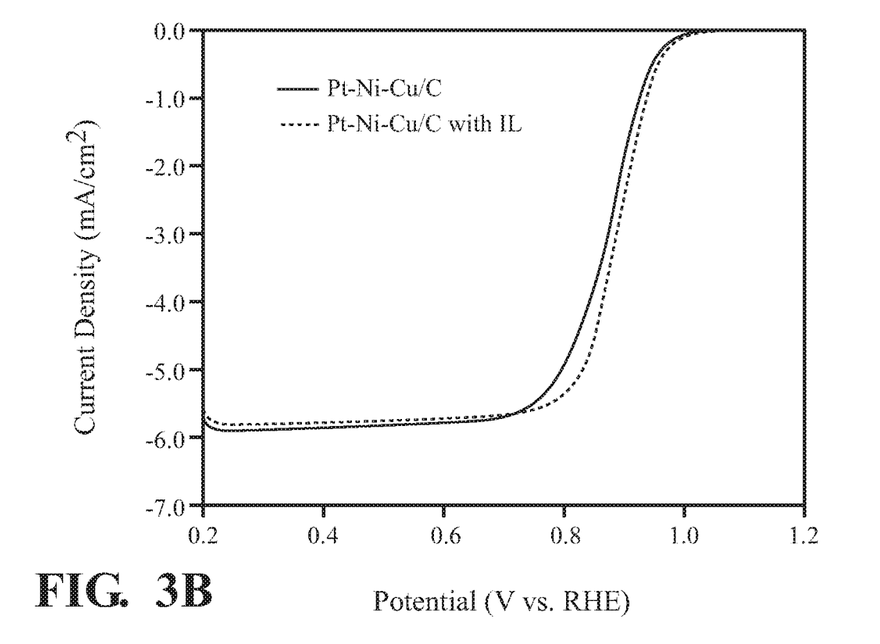
FIG. 3B shows linear sweep voltammogram across an electric potential window of 0.05 V to 1.2 V of the electrochemical cells of FIG. 2A.

FIGS. 3A and 3B shows cyclic voltammetry and linear sweep voltammetry curves for the same PEMFCs as those of FIGS. 2A and 2B, but across an electric potential window of 0.05 V to 1.2 V vs. RHE. Very similar ECSA values were obtained, being 45 and 43 m2/gPt respectively without and with ionic liquid. The SA and MA increased 77% and 69% respectively after IL incorporation.

Figure 3C:
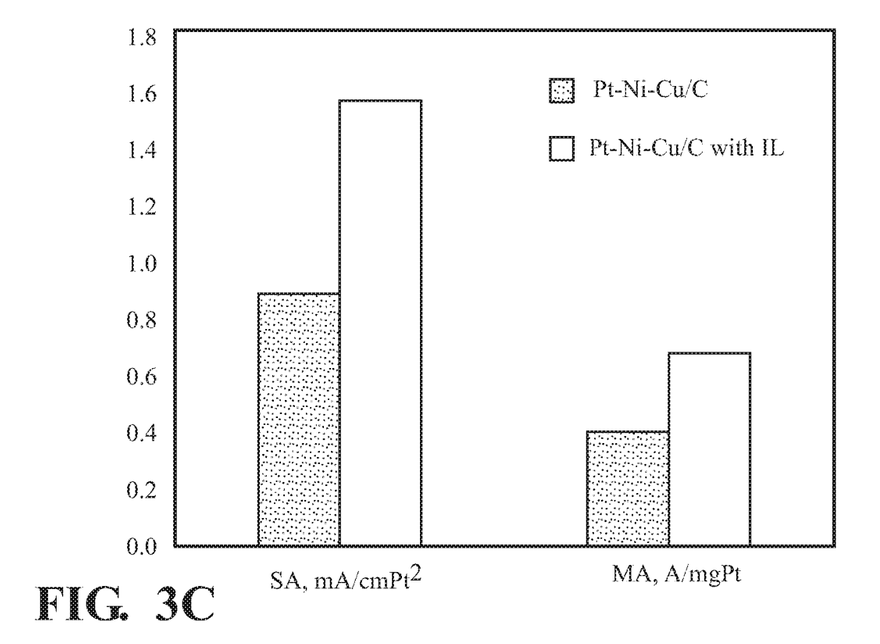
FIG. 3C shows calculated specific activity and mass activity, at 0.9 V vs RHE, for the electrochemical cells of FIGS. 2A and 2B, and calculated across the electric potential window of 0.05 V to 1.2 V.

FIG. 3C shows specific activity and mass activity calculated from the curves of FIGS. 3. The SA and MA increased 77% and 69% respectively after IL incorporation.

It will be understood that Equation 4 generally describes the rate of ORR:

$$i = nFK[O_2](1-\theta)\exp\left(\frac{-\beta FE}{RT}\right)\exp\left(\frac{-\omega\theta}{RT}\right) \qquad \text{Eq. 4}$$

where n is number of electron transferred, F is faraday constant, K is a chemical rate constant, (1-θ) is the available surface, β is symmetry factor, E is the applied potential, and ω is the energy parameter for the Temkin isotherm. Thus, Equation 4 indicates that current density is proportional to oxygen concentration.

Because the [MTBD][C$_4$F$_9$SO$_3$] ionic liquid has an appreciable oxygen solubility and is expected to increase oxygen concentration at the platinum alloy surface, it could be further expected that this will yield a proportional increase in current density. The results shown in FIGS. 2C and 3C indicate mass activity improvements resulting from contact of the platinum alloy nanoparticles by the [MTBD][C$_4$F$_9$SO$_3$] ionic liquid, as indicated above. It will be noted that the current density is not only determined by the concentration of reactant (C) near the surface, but also the thickness of diffusion layer (δ) and diffusion coefficient (D). Therefore, the product of C and D can be considered as an important parameter to judge effectiveness of gas diffusion through a solid electrolyte. From Table 1, one can see that due to the much lower diffusion coefficient of oxygen (D$_{O2}$), the final product of C×D didn't show a higher value than in the aqueous electrolyte (0.1 M HClO$_4$ in this work). Thus, one can speculate that the comparable oxygen mole flux might be one of the factors to limit the dramatic boost of ORR activity resulting from the presence of the secondary ionomer.

TABLE 1

The solubility and diffusion coefficient of oxygen in ILs used in this study

| Sample | Form | [O$_2$] at R.T. (mM) | D$_{O2}$ at 30 bar (10$^{-6}$ cm$^2$/s) | [O$_2$] × D$_{O2}$ at R.T. (10$^{-6}$ mol · cm$^{-1}$/s) |
|---|---|---|---|---|
| MTBD[beti] | Liquid | 5.9 | 1.76 @ R.T. | 10.21 |
| MTBD[TFSI] | Liquid | 5.5 | 3.04 @ R.T. | 16.72 |
| [MTBD][C$_2$F$_5$OC$_2$F$_4$SO$_3$] | Solid | 8.1 | —* | — |
| [MTBD][C$_6$F$_{13}$SO$_3$] | Solid | 10.9 | 22 @ 60° C. | — |
| [MTBD][C$_4$F$_9$SO$_3$] | Solid | 8.4 | 16 @ 60° C. | — |
| 0.1M HClO$_4$ | Liquid | 1.18 | 19 @ R.T. | 22.42 |

Note
*The melting point of [MTBD][C$_2$F$_5$OC$_2$F$_4$SO$_3$] is ~59° C. A temperature greater than 70° C. is required to completely melt it.

The present invention is further illustrated with respect to the following examples. It needs to be understood that these examples are provided to illustrate specific embodiments of the present invention and should not be construed as limiting the scope of the present invention.

Example 1. Synthesis of Octahedral Pt—Cu—Ni

The octahedral Pt—Cu—Ni/C samples are prepared using a scalable, surfactant-free, and facile innovative solid state chemistry method, which involved impregnation of metal precursors on a C support (Vulcan XC 72) and reducing them in a stream of CO and H$_2$ gas mixture. As for the specific procedure, Carbon black (Vulcan XC-72) is thermally treated in air at 300° C. overnight to remove moisture prior to use. Platinum(II) acetylacetonate, copper(II) acetylacetonate, and nickel(II) acetylacetonate are dissolved in acetone at a molar ratio of 2:1:1 (Pt:Cu:Ni) and added dropwise onto the pre-treated C support under vigorous stirring to a final concentration of 20 wt. % Pt loading. The mixture is kept in a vacuum chamber for 1 hour, resulting in complete removal of residual acetone. The dried mixture is then reduced by exposure to a gas flow of $H_2/CO$ (5/120 cm$^3$/min) under a temperature ramp of 5° C./min to a final temperature of 200° C., which is maintained for one hour under continued gas flow. The mixture is allowed to return to ambient temperature under continued $H_2/CO$ gas flow. After ambient temperature is reached, gas flow is switched to argon to purge the system before the product is collected.

Example 2. Synthesis of 1H-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][C$_4$F$_9$SO$_3$])

A solution of MTBD (3.00 g, 0.0196 mol) in water (100 mL) is cooled down to 0° C., and Nitric Acid (1.76 g, 0.0196 mol) is added dropwise to the solution. This is followed by the addition of potassium nonafluorobutane sulfonate (8.58 g, 0.0196 mol), with stirring for 1 hour. The resulting ionic liquid is separated as a viscous fluid phase beneath the water phase. It is washed 4 times with ultrapure water. The resulting ionic liquid is dried under reduced pressure at 50° C. for 18 hours to obtain a white material having a melting temperature of about 45° C.

Example 3. Preparation of Pt—Ni—Cu ([MTBD][C$_4$F$_9$SO$_3$]) Catalyst 5 mg/mL ([MTBD][C$_4$F$_9$SO$_3$]) in isopropanol is prepared. Pt—Ni—Cu/C catalyst is placed in a vial and wetted with 0.5 ml deionized water wetted 0.5 ml DI water first, followed by adding desired ionic liquid stock solution with various IL/C weight ratios of 0, 1.28, 2.56, and 3.84. The mixture is ultrasonicated for 20 min, and the solvent is slowly removed at 45° C. at ambient atmosphere. Finally, the obtained powder is further dried under high vacuum (−1 bar, room temperature) overnight.

Example 4. Preparation of Rotating Disk Electrode with Catalyst 10 mg of the product powder from Example 3 is mixed with 6 mL deionized water, 4 mL isopropanol, and 40 uL Nafion™ ionomer (Nafion DE 520). This mixture is bath sonicated for 15 minutes and then probe sonicated for one minute to produce the catalyst ink. 10 µL of the catalyst ink is transferred onto a freshly polished and rinsed glassy carbon electrode (5 mm diameter). The electrode is mounted to an electrode rotator (Pine Research Instrumentation, Inc.) and rotated at 400 rpm.

Example 5. Electrochemical Measurements

All electrochemical measurements are performed on a Pine Instrumentation RDE workstation. A three-electrode system, consisting of the catalyst film-coated glassy carbon working electrode from Example 3, a platinum wire counter electrode, and a HydroFlex™ reference electrode (ET070, eDAQ Inc.) were used for all electrochemical measurements. The electrolyte (0.1 M HClO$_4$) is freshly prepared for each measurement.

Nitrogen gas is flowed through cell for 30 minutes to saturate the electrolyte prior to testing. Cyclic voltammetry tests are performed at a sweep rate of 50 mV/s across the potential window (from 0.05V to 1.0 V or, alternatively, from 0.05 V to 1.2 V; see FIGS. 2A and 3A). Five such data cycles are run after 50 conditioning cycles performed with the same parameters. The fourth data cycle is used to calculate ECSA, by integrating the area in the hydrogen adsorption range (about 0.05 volts to 0.40 volts).

Electrochemical Impedance Spectroscopy (EIS) is conducted at 0.9 volts from 105 Hz to 1 Hz, with amplitude of 5 mV, and the solution resistance (Rs) is obtained. EIS data (not shown) is used to composite the ohmic loss.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An oxygen reduction reaction (ORR) catalyst comprising:
   octahedral nanoparticles comprising a platinum alloy having platinum, nickel, and copper (Pt-Ni-Cu); and a secondary ionomer contacting the octahedral nanoparticles, the secondary ionomer comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]).

2. The ORR catalyst as recited in claim 1, wherein the octahedral nanoparticles comprise nickel and copper present at a nickel:copper molar ratio within a range of about 1:2 to about 2:1.

3. The ORR catalyst as recited in claim 2, wherein the octahedral nanoparticles comprise nickel and copper present at a nickel:copper molar ratio of about 1:1.

4. The ORR catalyst as recited in claim 1, wherein the octahedral nanoparticles comprise platinum and nickel present at a platinum:nickel molar ratio within a range of about 1:1 to about 4:1.

5. The ORR catalyst as recited in claim 4, wherein the octahedral nanoparticles comprise platinum and nickel present at a platinum:nickel molar ratio of about 2:1.

6. The ORR catalyst as recited in claim 1, wherein the secondary ionomer is present at a weight ratio relative to the platinum alloy within a range of 1.25:1 to 3.85:1.

7. The ORR catalyst as recited in claim 1, wherein the secondary ionomer is present at a weight ratio relative to the platinum alloy within a range of 2:1 to 3:1.

8. The ORR catalyst as recited in claim 1, wherein the secondary ionomer is present at a weight ratio relative to the platinum alloy within a range of 2.5:1 to 2.6:1.

9. The ORR catalyst as recited in claim 1, comprising a polymeric ionomer in contact with the platinum alloy.

10. The ORR catalyst as recited in claim 1, wherein the secondary ionomer completely coats the platinum alloy.

11. The ORR catalyst as recited in claim 1, wherein the secondary ionomer partially coats the platinum alloy.

12. The ORR catalyst as recited in claim 1, wherein the octahedral nanoparticles comprise porous particles and the secondary ionomer is at least partially impregnated in the porous particles.

13. A cathode for oxygen reduction, the cathode comprising:
    a cathodic current collector;
    octahedral nanoparticles comprising a platinum alloy having platinum, nickel, and copper (Pt-Ni-Cu); and
    a secondary ionomer contacting the octahedral nanoparticles, the secondary ionomer comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]).

14. The cathode as recited in claim 13, wherein the octahedral nanoparticles comprise nickel and copper present at a nickel:copper molar ratio within a range of about 1:2 to about 2:1.

15. The cathode as recited in claim 14, wherein the octahedral nanoparticles comprise nickel and copper present at a nickel:copper molar ratio of about 1:1.

16. The cathode as recited in claim 13, wherein the octahedral nanoparticles comprise platinum and nickel present at a platinum:nickel molar ratio within a range of about 1:1 to about 4:1.

17. The cathode as recited in claim 16, wherein the octahedral nanoparticles comprise platinum and nickel present at a platinum:nickel molar ratio of about 2:1.

18. The cathode as recited in claim 13, wherein the secondary ionomer is present at a weight ratio relative to the platinum alloy within a range of 2:1 to 3:1.

19. The cathode as recited in claim 13, wherein the secondary ionomer is present at a weight ratio relative to the platinum alloy within a range of 2.5:1 to 2.6:1.

20. A polymer electrolyte fuel cell comprising the cathode of claim 13.

* * * * *